(12) United States Patent
Henderson (10) Patent No.: US 11,879,567 B2
(45) Date of Patent: Jan. 23, 2024

(54) MICROVALVE USING NEAR-FIELD-ACOUSTIC LEVITATION AND METHODS THEREOF

(71) Applicant: New Scale Technologies, Inc., Victor, NY (US)

(72) Inventor: David A. Henderson, Farmington, NY (US)

(73) Assignee: NEW SCALE TECHNOLOGIES, INC., Victor, NY (US)

( * ) Notice: Subject to any disclaimer, the term of this patent is extended or adjusted under 35 U.S.C. 154(b) by 0 days.

(21) Appl. No.: 17/942,309

(22) Filed: Sep. 12, 2022

(65) Prior Publication Data

US 2023/0081249 A1    Mar. 16, 2023

Related U.S. Application Data

(60) Provisional application No. 63/242,579, filed on Sep. 10, 2021.

(51) Int. Cl.
*F16K 99/00*    (2006.01)

(52) U.S. Cl.
CPC ...... *F16K 99/0055* (2013.01); *F16K 99/0042* (2013.01); *F16K 99/0005* (2013.01); *F16K 99/0048* (2013.01)

(58) Field of Classification Search
CPC ............. F16K 99/0055; F16K 99/0042; F16K 99/0048; F16K 99/0005
USPC ................. 251/12, 331; 137/487.5, 827, 828
See application file for complete search history.

(56) References Cited

U.S. PATENT DOCUMENTS

| | | | | |
|---|---|---|---|---|
| 4,581,624 A | * | 4/1986 | O'Connor | F16K 99/0051 216/2 |
| 4,628,576 A | * | 12/1986 | Giachino | F16K 99/0048 29/890.128 |
| 5,029,805 A | * | 7/1991 | Albarda | F16K 99/0011 251/129.1 |
| 5,092,360 A | * | 3/1992 | Watanabe | C04B 37/026 252/62.9 R |
| 5,244,537 A | * | 9/1993 | Ohnstein | F15C 5/00 216/18 |
| 6,131,879 A | * | 10/2000 | Kluge | F16K 99/0009 137/831 |
| 7,025,324 B1 | * | 4/2006 | Slocum | F16K 99/0051 251/231 |

(Continued)

*Primary Examiner* — Minh Q Le
(74) *Attorney, Agent, or Firm* — Troutman Pepper Hamilton Sanders LLP (Rochester)

(57) ABSTRACT

Microvalve assemblies are disclosed that in some examples include a body including first and second ports and a body plate. The microvalve assemblies further include an actuator assembly including one or more exterior plates coupled to a stack. One of the one or more exterior plates contacts the body plate to form a seat and thereby restrict fluid flow from the first port to the second port, when the stack is not energized. Additionally, the actuator assembly is configured to, when the stack is energized, periodically generate a gap between the one of the one or more exterior plates and the body plate via near-field-acoustic-levitation (NFAL) to allow fluid flow through the first and second ports. Advantageously, the microvalves of this technology are relatively small and consume minimal power, thereby overcoming size and power limitations of existing valves, including pneumatic valve technologies.

20 Claims, 7 Drawing Sheets

(56) References Cited

U.S. PATENT DOCUMENTS

| | | | | |
|---|---|---|---|---|
| 7,217,395 | B2* | 5/2007 | Sander | F04B 43/046 |
| | | | | 347/68 |
| 2001/0038083 | A1* | 11/2001 | Sakurai | F16K 31/007 |
| | | | | 251/129.06 |
| 2002/0130284 | A1* | 9/2002 | Knebel | G05D 23/025 |
| | | | | 251/11 |
| 2008/0296523 | A1* | 12/2008 | Gianchandani | F16K 99/0001 |
| | | | | 251/368 |
| 2013/0095400 | A1* | 4/2013 | Lundblad | F16K 31/00 |
| | | | | 429/422 |
| 2015/0219237 | A1* | 8/2015 | Maichl | H10N 30/2045 |
| | | | | 251/129.01 |
| 2015/0251179 | A1* | 9/2015 | Asai | B01L 3/50273 |
| | | | | 60/527 |
| 2017/0218949 | A1* | 8/2017 | Yokoi | F04B 49/06 |
| 2018/0223829 | A1* | 8/2018 | Tanaka | F04B 45/047 |
| 2019/0101940 | A1* | 4/2019 | Mou | F04B 41/06 |
| 2019/0247880 | A1* | 8/2019 | Mou | F04B 45/047 |
| 2019/0353157 | A1* | 11/2019 | Mou | F04B 45/047 |
| 2020/0030801 | A1* | 1/2020 | Iimura | B01J 19/00 |
| 2020/0326010 | A1* | 10/2020 | Duqi | F16K 31/005 |
| 2020/0392954 | A1* | 12/2020 | Mou | G01W 1/08 |
| 2021/0041280 | A1* | 2/2021 | Wald | F16K 99/0048 |
| 2021/0147221 | A1* | 5/2021 | Mou | F04B 43/046 |
| 2021/0296567 | A1* | 9/2021 | Mou | H10N 30/02 |
| 2021/0340969 | A1* | 11/2021 | Bartels | F04B 45/10 |
| 2021/0351338 | A1* | 11/2021 | Giusti | F16K 99/0015 |
| 2022/0099084 | A1* | 3/2022 | Mou | F04B 43/046 |
| 2022/0109097 | A1* | 4/2022 | Shabanian | F04B 53/22 |

\* cited by examiner

MICROVALVE USING NEAR-FIELD-ACOUSTIC LEVITATION AND METHODS THEREOF

This application claims the benefit of Provisional Patent Application No. 63/242,579, filed Sep. 10, 2021, which is hereby incorporated by reference in its entirety.

FIELD

This technology generally relates to valves used for fluid control and, more specifically, micro pneumatic valves used in large numbers in compact configurations.

BACKGROUND

Fluid control is a critical technology for many industries including motion control, robotics, prosthetics, human-machine interfaces, and haptics. These industries need to control more pneumatic channels in less space, with lower power, greater precision, and embedded digital control. Existing valve technologies such as solenoids, motors, and quasi-static piezoelectric actuators are near the current limits of miniaturization.

SUMMARY

In one example, a microvalve assembly is disclosed that includes a body including first and second ports and a body plate and an actuator assembly including one or more exterior plates coupled to a stack. One of the one or more exterior plates contacts the body plate to form a seat and thereby restrict fluid flow from the first port to the second port, when the stack is not energized. The actuator assembly is configured to, when the stack is energized, periodically generate a gap between the one of the one or more exterior plates and the body plate via near-field-acoustic-levitation (NFAL) to allow fluid flow through the first and second ports.

In another example, a system is disclosed that includes a microvalve assembly including a body including first and second ports and a body plate and an actuator assembly including one or more exterior plates coupled to a stack. One of the one or more exterior plates contacts the body plate to form a seat and thereby restrict fluid flow from the first port to the second port, when the stack is not energized. The system further includes an energizing system configured to apply an alternating voltage to the stack to periodically generate a gap between the one of the one or more exterior plates and the body plate via NFAL to allow fluid flow through the first and second ports.

In yet another example, a method for manufacturing a microvalve assembly is disclosed that includes providing a body comprising first and second ports and a body plate. A stack is coupled to one or more exterior plates to form an actuator assembly disposed within the body and between the first and second ports. At least one spring is coupled to the body and the actuator assembly such that the spring is configured to apply a force to the actuator assembly to cause one of the one or more exterior plates to contact the body plate to form a seat and thereby restrict fluid flow from the first port to the second port. The stack is then electrically connected to an energizing system configured to energize the stack to periodically generate a gap between the one of the one or more exterior plates and the body plate via NFAL to allow fluid flow through the first and second ports.

This technology provides a number of advantages including overcoming size and power limitations of existing pneumatic valve technologies by using near-field-acoustic-levitation (NFAL), actuated by piezoelectric motion, to open and close micro valves.

DETAILED DESCRIPTION

Referring to FIGS. 1-5, an exemplary microvalve assembly 100 in various states is illustrated. In this example, the microvalve assembly 100 includes an input port 102 and an output port 103 that are part of a body 101. The body 101 also includes a body plate 104 that is discontinuous with respect to, or disposed on both sides of, the output port 103. The microvalve assembly 100 further includes an actuator assembly 110 within the body 101, which includes an exterior plate 105 coupled or bonded to a stack 106. While only one exterior plate 105 and one stack 106 are illustrated in this example, more plates and/or stacks can also be used in other examples.

In some examples, the stack 106 includes a material that is piezoelectric, which can be a relatively hard piezoelectric material with a co-fired multi-layer construction. A relatively hard piezoelectric material has a lower dielectric loss to reduce heating at higher frequencies, and a lower D31 constant, and a multi-layer construction reduces the voltage amplitude required to achieve the same oscillation amplitudes. However, other types of piezoelectric material and/or construction, and other materials, such as electrostrictive, magnetostrictive, and/or electromagnetic materials, can also be used for the stack 106 in other examples.

Figure 1:
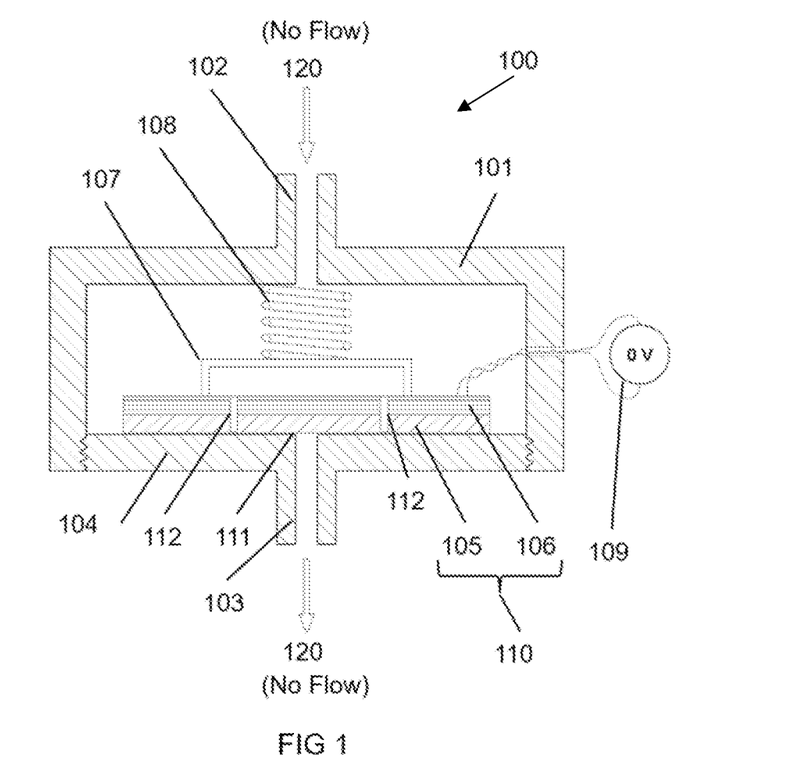
FIG. 1 is a cross-sectional view of an exemplary microvalve without fluid flow, and with near-field-acoustic-levitation (NFAL), that is not energized.

In one state of the microvalve assembly 100 (e.g., as illustrated in FIG. 1), the exterior plate 105 is configured to be pressed against the body plate 104 with mating surfaces (i.e., an exterior surface of the exterior plate 105 and an interior surface of the body plate 104) contacting at a seat 111 to form a seal and thereby restrict fluid flow 120 to the output port 103. In other states of the microvalve assembly 100, the exterior plate 105 is spaced from the body plate 104 to facilitate fluid flow from the input port 102 through the output port 103, as described and illustrated in more detail below. Input and output ports 102 and 103, respectively, show a flow (or lack thereof) in a specific direction in some of the examples provided herein. However, the microvalve assembly 100 can modulate fluid flow in either direction. Additionally, the microvalve assembly 100 also may have a circular or rectangular configuration, for example, and other configurations can also be used in other examples.

In some examples, a spring 108 is coupled to the body 101 proximate the input port 102. In these examples, the spring 108 is configured to apply a force to the actuator assembly 110 to facilitate the pressing of the exterior plate 105 against the body plate 104 to form the seal at the seat 111, as illustrated in FIG. 1. In one particular example, the spring 108 applies the force via a bridge 107, which is disposed between the stack 106 and the spring 108, to maintain substantially zero gap at seat 111 and substantially zero fluid flow 120 when an input voltage from an energizing system 109 to the stack 106 is zero. Any number of bridges and/or springs can be used, and/or the spring(s) can directly contact the stack 106 without a bridge, in other examples.

The energizing system 109 can be any power source or other means configured to apply a voltage to the stack 106, with positive or negative polarity, in order to increase or decrease the length and/or diameter of the stack 106 by generating in-plane D31 strain. In some examples, the energizing system 109 can be a full-bridge drive circuit as described, by way of example, in U.S. Pat. Nos. 8,217,553 and/or 8,304,960, each of which is hereby incorporated by reference herein in its entirety, although other types of energizing systems can also be used.

The change in length and/or diameter of the stack 106 causes the actuator assembly 110 to bend upward or downward. An example of such bending, (e.g., piezoelectric bending) is described in U.S. Pat. No. 3,622,815, which is hereby incorporated by reference herein in its entirety. The bending principal applies to many types of configurations of the microvalve assembly 100, including both circular and rectangular configurations.

Figure 2:
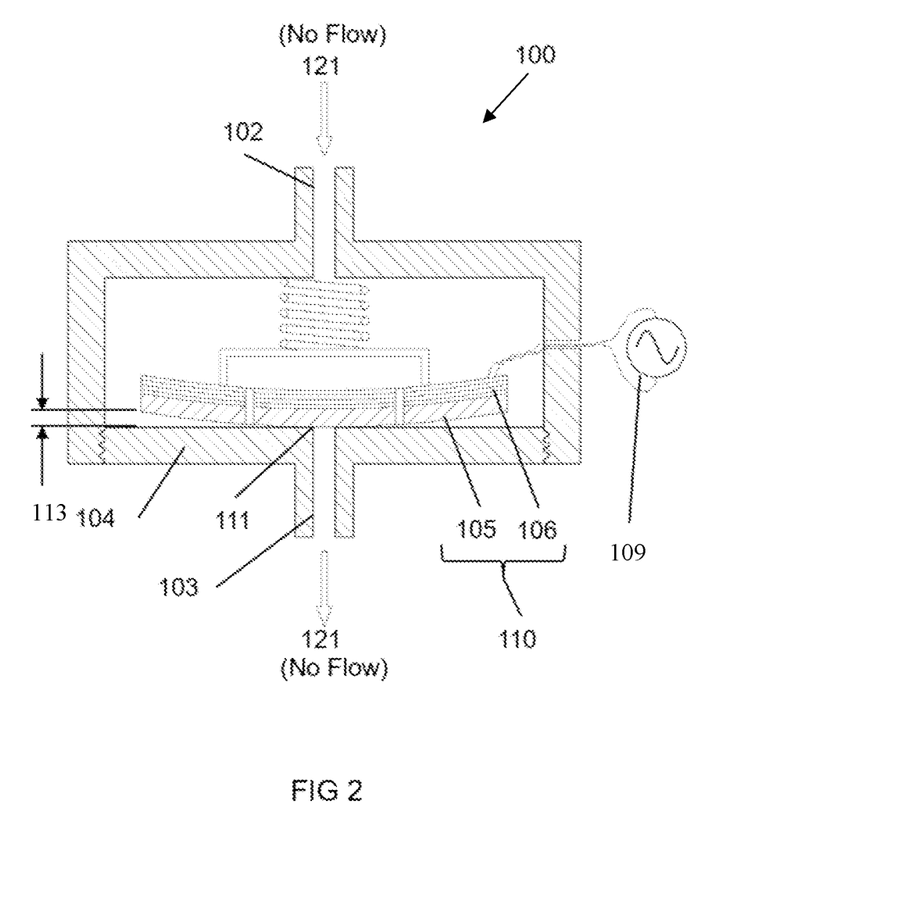
FIG. 2 is cross-sectional view of the exemplary microvalve of FIG. 1 without fluid flow and that is energized with a voltage that generates upward bending of an actuator assembly but not NFAL.
Figure 3:
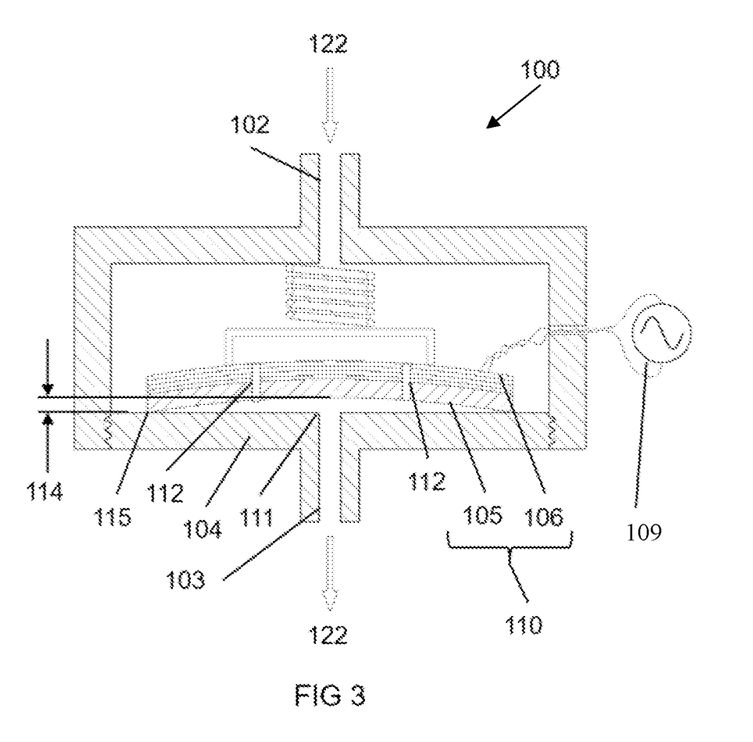
FIG. 3 is cross-sectional view of the exemplary microvalve of FIG. 1 with relatively small fluid flow and that is energized with a voltage that generates downward bending of the actuator assembly to create a relatively small gap on a valve seal but not NFAL.

In some examples, (e.g., as illustrated in FIGS. 2-3) voltages applied by the energizing system 109 to the actuator assembly 110 may be static or alternate between maximum and minimum polarities at sufficient amplitudes and frequencies to generate near-field-acoustic-levitation (NFAL). The bending amplitude of the actuator assembly 110 is determined by the driving voltage of the energizing system 109 and the various properties of the actuator assembly 110, such as the type of piezoelectric material, D31 constant, the thickness of the layers in the stack 106, and the stiffness of the exterior plate 105, for example.

Accordingly, in operation, the actuator assembly 110 is configured to, when energized by the energizing system 109, oscillate, or periodically generate, a gap between an exterior surface of the actuator assembly 110 (e.g., the exterior surface of the exterior plate 105) and the opposing interior surface of the body plate 104 via near-field-acoustic-levitation (NFAL) to allow fluid flow through the input and output ports 102 and 103. Referring to FIG. 1, the microvalve assembly 100 is illustrated in a state in which the voltage applied by the energizing system 109 is substantially zero. In this state, the gap at seat 111 is substantially zero and the fluid flow 120 also is substantially zero.

Referring to FIG. 2, the microvalve assembly 100 is illustrated in a state in which the voltage applied by the energizing system 109 causes an upward bending of the actuator assembly 110. Accordingly, the gap 113 at the outer edge of the actuator assembly 110 is positive. However, the gap at the seat 111 remains substantially zero and the fluid flow 121 also is substantially zero.

Referring to FIG. 3, the microvalve assembly 100 is illustrated in a state in which the voltage applied by the energizing system 109 also causes an upward bending of the actuator assembly 110. The outer edge of actuator assembly 110 contacts the body plate 104 at an interface 115. The openings 112 (e.g., passages or apertures) in the actuator assembly 110 allow fluid flow 122 to the output port 122 when the outer edge of the actuator assembly 110 contacts the body plate 104 at the interface 115. The gap 114 at the seat 111 is positive and a small fluid flow 122 is allowed. While two openings 112 in the actuator assembly 110 are illustrated in this example, any number of openings (or no openings) can be provided in other examples.

To achieve a relatively large or significant gap 114, and a relatively useful rate of fluid flow 122, a D31 constant of less than $-250 \times 10^{-12}$ m/v and voltage greater than 100 volts can be used. The rate of the fluid flow 122 is controlled by modulating the polarity of the voltage amplitude between states. Exemplary fluid flow 122 modulation methods include static voltage amplitude, rapid ON/OFF voltage, or constant frequency with varying amplitude, although other methods for modulating fluid flow can also be used in other examples.

Figure 4:
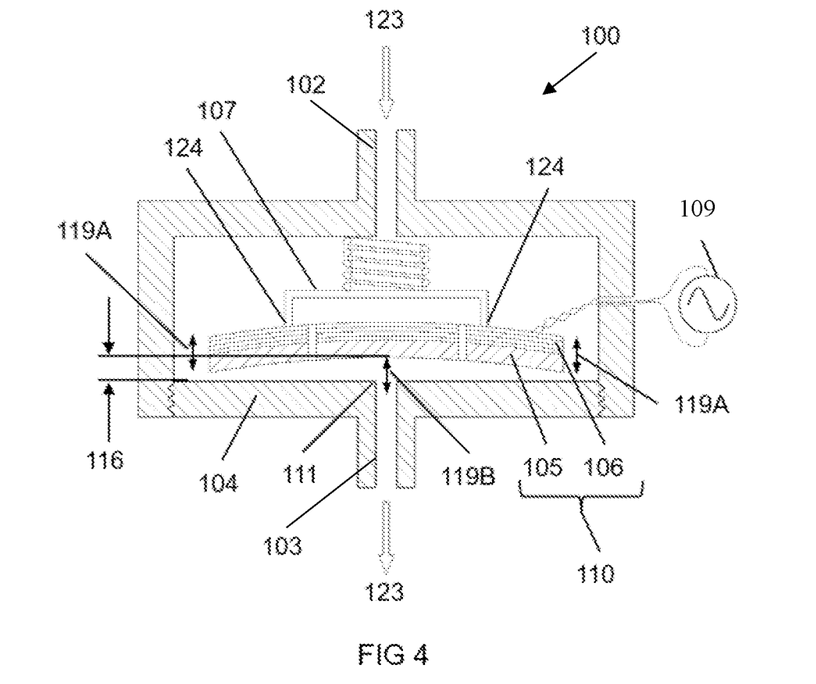
FIG. 4 is cross-sectional view of the exemplary microvalve of FIG. 1 with increased fluid flow and that is energized with sufficient voltage, amplitude, and frequency to generate a peak amplitude of upward bending of the actuator assembly to generate NFAL and an increased gap on the valve seal.
Figure 5:
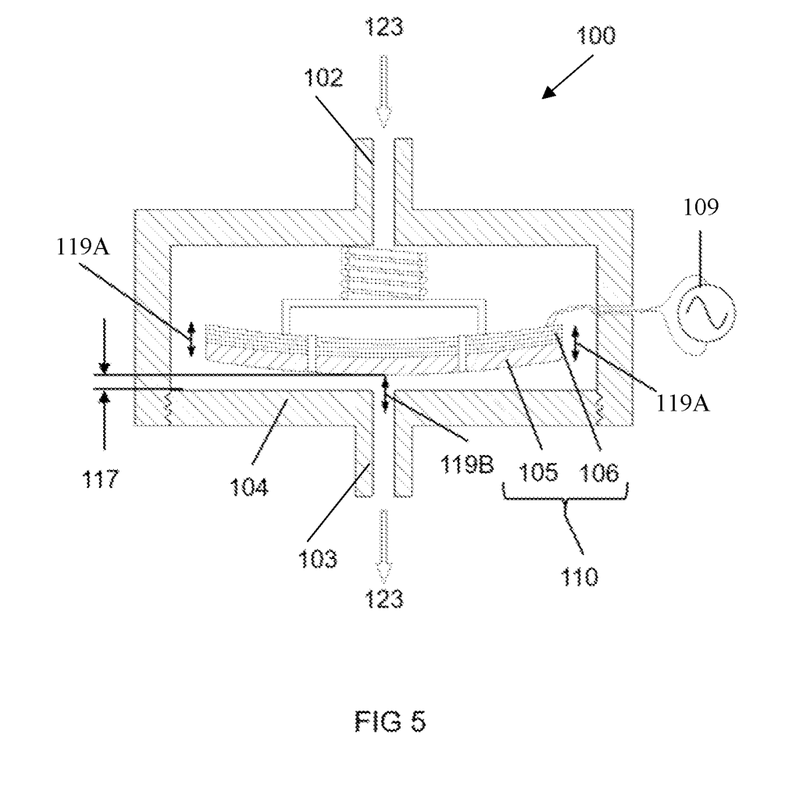
FIG. 5 is cross-sectional view of the exemplary microvalve of FIG. 1 with increased fluid flow and that is energized with sufficient voltage, amplitude, and frequency to generate a peak amplitude of downward bending of the actuator assembly to generate NFAL and an increased gap on the valve seal.

Referring more specifically to FIGS. 4-5, an alternating voltage is applied by the energizing system 109 to the actuator assembly 110 with sufficient amplitude and frequency to induce NFAL. The alternating voltage in this example causes oscillation amplitudes 119A and 119B of actuator assembly 110, the generation of gaps 116 and 117, and the resulting positive fluid flow 123. Oscillation amplitudes 119A and 119B are similar with a phase shift of 180 degrees in this particular example.

The NFAL principle uses surfaces that are in close proximity in which the gap between the surfaces is rapidly oscillating. The oscillation frequency and amplitude are sufficiently high that the non-linear compressibility of gases, including air, results in an increased gap and positive pressure generated in the gap between the surfaces. The NFAL principal is described, by way of example, in Elie, N., Blouin, A., and Brunetière, N., "Dynamic Invariance in Near-Field Acoustic Levitation." ASME. Letters Dyn. Sys. Control, May 31, 2021 and/or M. Shi, K. Feng, J. Hu, J. Zhu, H. Cui, "Near-field acoustic levitation and applications to bearings: a critical review," International Journal of Extreme Manufacturing, Volume 1, Number 3, Sep. 12, 2019, each of which is hereby incorporated by reference herein in its entirety.

Referring specifically to FIG. 4, the actuator assembly 110 at the peak downward bending of the oscillation is illustrated. The gap 116 in this example is the NFAL gap amplitude plus the oscillation amplitude 119B. FIG. 5 shows the actuator assembly 110 at the peak upward bending of the oscillation wherein the gap 117 is the NFAL gap amplitude minus the oscillation amplitude 119B. In this example, the NFAL uses voltage frequencies in the tens of kilohertz, the effective gap is the average of gaps 116 and 117, and the rate of fluid flow 123 is essentially constant for a given effective gap. However, other frequency ranges can also be used in other examples.

Accordingly, the flow rate 123 through the microvalve assembly 100 is modulated from zero to a maximum flow rate in this example by modulating the effective gap from zero to a maximum gap by changing the properties of the voltage supplied by the energizing system 109, such as the frequency, amplitude, or duty cycle. However, other flow modulation methods can also be used in other examples. Additionally, the voltage applied by the energizing system 109 may have any number of waveforms such as sinusoidal, trapezoidal, or square wave, for example.

In some examples, the voltage frequency is substantially the same as a bending resonant frequency or bending resonance of the actuator assembly 110 and the resonant gain increases the oscillation amplitudes 119A and 119B while reducing the voltage amplitude to less than ten volts. To maximize resonant gain, the bridge 107 contacts the actuator assembly 110 at the interfaces 124 of the bending resonance of the actuator assembly 110. However, non-resonant frequencies with other voltage amplitudes and alternative bridge placements and interfaces with the actuator assembly 110 can also be used in other examples.

Figure 6:
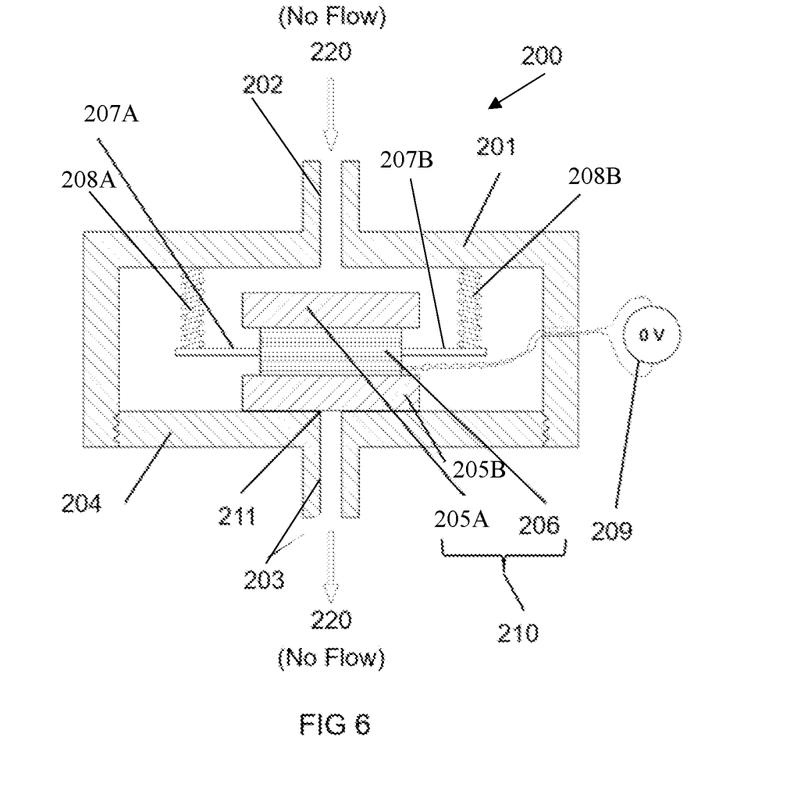
FIG. 6 is a cross-sectional view of another exemplary microvalve without fluid flow, and with NFAL, that is not energized.
Figure 7:
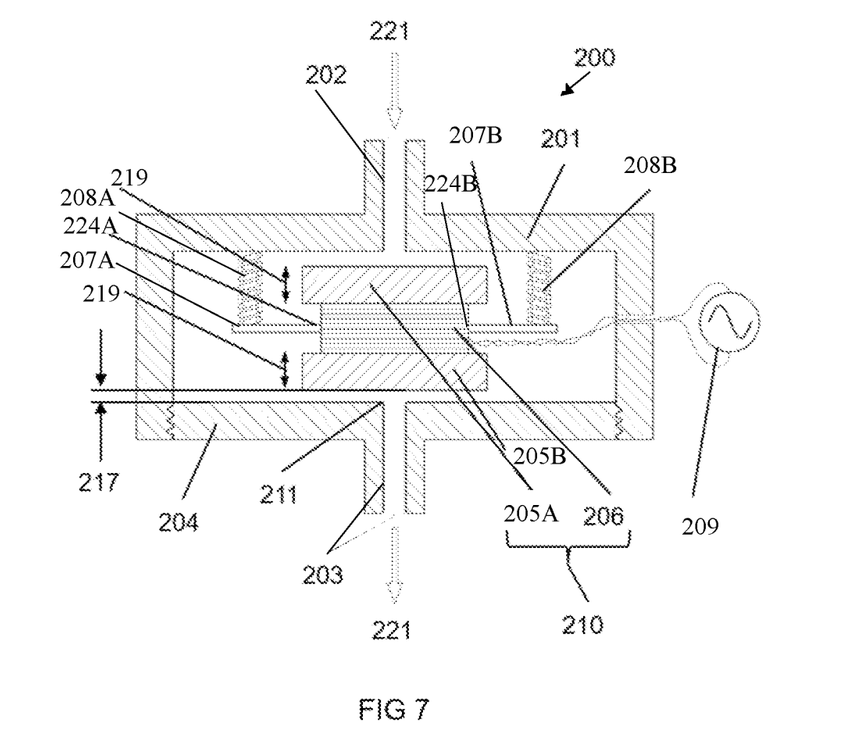
FIG. 7 is a cross-sectional view of the exemplary microvalve of FIG. 6 with fluid flow and that is energized with sufficient amplitude and frequency to generate a vertical motion in a piezoelectric actuator to generate NFAL and a gap on the valve seal.

Referring to FIGS. 6-7, another exemplary microvalve assembly 200 in various states is illustrated. In this example, the microvalve assembly 200 includes an input port 202 and an output port 203 that are part of a body 201. The body 201 also includes a body plate 204 that is discontinuous with respect to, or disposed on both sides of, the output port 203. The microvalve assembly 100 further includes an actuator assembly 210 within the body 201, which includes a stack 206 (e.g., a piezoelectric stack), a first exterior plate 205A disposed toward the input port 202 with respect to the stack 206 and a second exterior plate 205B disposed toward the output port 203 with respect to the stack 206.

Accordingly, the first and second exterior plates 205A-B are coupled or bonded to opposing sides of the stack 206. While two plates (i.e., the first and second exterior plates 205A-B) are illustrated in this example, more plates or only one plate disposed toward the output port 203 with respect to the stack 206 can also be used in other examples. The stack 206 can be made of the same material(s) as, or one or more different material(s) than, the stack 106.

In one state of the microvalve assembly 200 (e.g., as illustrated in FIG. 6), the second exterior plate 205B is configured to be pressed against the body plate 204 with mating surfaces (i.e., an exterior surface of the second exterior plate 205B and an interior surface of the body plate 204) contacting at a seat 211 to form a seal and thereby restrict fluid flow 220 to the output port 203. In other states of the microvalve assembly 200, the second exterior plate 205B is spaced from the body plate 104 to facilitate fluid flow 221 from the input port 202 through the output port 203, as described and illustrated in more detail below. Input and output ports 202 and 203, respectively, show a flow (or lack thereof) in a specific direction in some of the examples provided herein. However, the microvalve assembly 200 can modulate fluid flow in either direction. Additionally, the microvalve assembly 200 also may have a circular or rectangular configuration, for example, and other configurations can also be used in other examples.

In some examples, a first spring 208A and a second spring 208B are coupled to the body 201 on opposite sides of the input port 202. In these examples, the first and second springs 208A-B are configured to apply a force to the actuator assembly 210 to facilitate the pressing of the second exterior plate 205B against the body plate 204 to form the seal at the seat 211, as illustrated in FIG. 6. In one particular example, the first and second springs 208A-B apply the force via first and second bridges 207A-B, respectively, which are coupled to the first and second springs 207A-B, respectively, and opposing sides of the stack 206, to maintain substantially zero gap at seat 211 and substantially zero fluid flow 220 when an input voltage from an energizing system 209 to the stack 106 is zero. While two springs (i.e., first and second springs 208A-B) and two bridges (i.e., bridges 207A-B) are illustrated in FIGS. 6-7, any number of bridges and/or springs can be used, and/or the spring(s) can directly contact the first exterior plate 205A without bridge (s), in other examples.

In operation, an energizing system 209 is configured to apply an alternating voltage to the stack 206, which responds to the alternating voltage by changing its length. The change in the length of the stack 206 depends on many factors including the piezoelectric layer thickness, the number of piezoelectric layers, the voltage amplitude, the piezoelectric material D33 constant, and the dialectic loss constant, for example. The stack 206 and first and second exterior plates 205A-B form the actuator assembly 210, which has an axial resonant frequency or axial resonance. To maximize resonant gain, one or more of the first and second bridges 207A-B can contact the actuator assembly 210 (e.g., the stack 206 of the actuator assembly 210) at interfaces 224A-B, respectively, of the axial resonant frequency.

Referring more specifically to FIG. 7, the alternating voltage is applied by the energizing system 209 to the actuator assembly 210 with sufficient amplitude and frequency to generate NFAL according to the principles described and illustrated above, to generate a gap 217 between the seat 211 and the second exterior plate 205B and thereby allow fluid flow 221 from the input port 202 through the output port 203.

In one particular example, the voltage applied by the energizing system 209 has a frequency in the tens of kilohertz to create the gap 217. However, other frequency ranges can also be used. Additionally, in some examples, the applied voltage frequency is substantially the same as the axial resonant frequency of the actuator assembly 210 and the resonant gain increases the oscillation amplitude 219 while reducing the amplitude of the applied voltage to less than ten volts. However, non-resonant frequencies with other voltage amplitudes can also be used in other examples. In some examples, the energizing system 209 can be a full-bridge drive circuit, and/or the same or different than the energizing system 109.

Accordingly, the rate of fluid flow 221 through the microvalve assembly (i.e., through input port 202 and output port 203) in this example is modulated from zero to a maximum rate by modulating the gap 217 from zero to a maximum by changing the properties of the voltage applied by the energizing system 209, such as the frequency, amplitude, or duty cycle. However, other methods for modulating the fluid flow can also be used in other examples. Additionally, the voltage applied by the energizing system 109 may have any number of waveforms such as sinusoidal, trapezoidal, or square wave, for example.

With this technology, NFAL is leveraged in miniaturized valves actuated by piezoelectric motion, for example. Accordingly, the microvalves of this technology are relatively small and consume minimal power, thereby overcoming size and power limitations of existing valves, including pneumatic valve technologies.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A microvalve assembly, comprising:
    a body comprising first and second ports and a body plate; and
    an actuator assembly comprising one or more exterior plates coupled to a stack, wherein:
        one of the one or more exterior plates contacts the body plate to form a seat and thereby restrict fluid flow from the first port to the second port, when the stack is not energized; and
        the actuator assembly is configured to, when the stack is energized, periodically generate a gap between the one of the one or more exterior plates and the body plate via near-field-acoustic-levitation (NFAL) to allow fluid flow through the first and second ports.

2. The microvalve assembly as set forth in claim 1, further comprising a spring coupled to the body and the actuator assembly, wherein the spring is configured to apply a force to the actuator assembly to form the seat and to compress when the stack is energized to allow formation of the gap.

3. The microvalve assembly as set forth in claim 2, wherein the spring is coupled to the stack via a bridge comprising first and second interfaces with the stack and a location of the first and second interfaces is based on a bending resonance of the actuator assembly.

4. The microvalve assembly as set forth in claim 1, wherein the stack comprises a material that is one or more of piezoelectric, electrostrictive, magnetostrictive, or electromagnetic.

5. The microvalve assembly as set forth in claim 1, further comprising an energizing system configured to energize the stack to thereby control the gap and the fluid flow through the first and second ports.

6. The microvalve assembly as set forth in claim 5, wherein the energizing system comprises a full-bridge drive circuit configured to modulate a frequency, amplitude, or duty cycle and thereby modulate a flow rate of the microvalve assembly.

7. The microvalve assembly as set forth in claim 5, wherein the actuator assembly is configured to bend at a bending resonant frequency, or change length at an axial resonant frequency, and comprises a resonant actuator that oscillates the gap at another resonant frequency at which the energizing system operates.

8. The microvalve assembly as set forth in claim 5, wherein the energizing system is configured to receive one or more inputs that are static, rapid ON/OFF, or constant frequency with varying amplitude to thereby modulate a rate of the fluid flow of the microvalve assembly from substantially zero to a maximum flow rate.

9. The microvalve assembly as set forth in claim 1, wherein the one or more exterior plates comprises first and second exterior plates coupled to opposing sides of the stack.

10. The microvalve assembly as set forth in claim 9, further comprising first and second springs coupled to the body and other opposing sides of the actuator assembly, wherein the first and second springs are configured to apply a force to the actuator assembly to form the seat and to compress when the stack is energized to allow formation of the gap.

11. The microvalve assembly as set forth in claim 10, wherein the first and second springs are coupled to the stack via first and second bridges, respectively, comprising first and second interfaces with the stack, wherein a location of the first and second interfaces is based on an axial resonance of the actuator assembly.

12. A system, comprising:
    a microvalve assembly comprising:
        a body comprising first and second ports and a body plate; and
        an actuator assembly comprising one or more exterior plates coupled to a stack, wherein one of the one or more exterior plates contacts the body plate to form a seat and thereby restrict fluid flow from the first port to the second port, when the stack is not energized; and
    an energizing system configured to apply an alternating voltage to the stack to periodically generate a gap between the one of the one or more exterior plates and the body plate via near-field-acoustic-levitation (NFAL) to allow fluid flow through the first and second ports.

13. The system as set forth in claim 12, wherein the microvalve assembly further comprises a spring coupled to the body and the actuator assembly, wherein the spring is configured to apply a force to the actuator assembly to form the seat and to compress when the stack is energized to allow formation of the gap.

14. The system as set forth in claim 13, wherein the spring is coupled to the stack via a bridge comprising first and second interfaces with the stack and a location of the first and second interfaces is based on a bending resonance of the actuator assembly.

15. The system as set forth in claim 12, wherein the one or more exterior plates comprises first and second exterior plates coupled to opposing sides of the stack and the microvalve assembly further comprises first and second springs coupled to the body and other opposing sides of the actuator assembly, wherein the first and second springs are configured to apply a force to the actuator assembly to form the seat and to compress when the stack is energized to allow formation of the gap.

16. The microvalve assembly as set forth in claim 15, wherein the first and second springs are coupled to the stack via first and second bridges, respectively, comprising first and second interfaces with the stack, wherein a location of the first and second interfaces is based on an axial resonance of the actuator assembly.

17. A method for manufacturing a microvalve assembly, the method comprising:
    providing a body comprising first and second ports and a body plate;
    coupling a stack to one or more exterior plates to form an actuator assembly disposed within the body and between the first and second ports;
    coupling at least one spring to the body and the actuator assembly such that the spring is configured to apply a force to the actuator assembly to cause one of the one or more exterior plates to contact the body plate to form a seat and thereby restrict fluid flow from the first port to the second port; and electrically connecting the stack to an energizing system configured to energize the stack to periodically generate a gap between the one of the one or more exterior plates and the body plate via near-field-acoustic-levitation (NFAL) to allow fluid flow through the first and second ports.

18. The method as set forth in claim 17, further comprising coupling a bridge to the spring and the stack, wherein the bridge is coupled to the stack at first and second interfaces determined based on a bending resonance of the actuator assembly.

19. The method as set forth in claim 17, wherein the one or more exterior plates comprises first and second exterior plates, the at least one spring comprises first and second springs, and the method further comprises coupling the first and second exterior plates to opposing sides of the stack and the first and second springs to the body and other opposing sides of the actuator assembly.

20. The method as set forth in claim 19, further comprising coupling first and second bridges to the first and second springs and the stack, wherein the first and second bridges are coupled to the stack at first and second interfaces determined based on an axial resonance of the actuator assembly.

* * * * *